(No Model.)
E. ANDERSON.
GRASS COLLECTOR FOR LAWN MOWERS.
No. 513,358. Patented Jan. 23, 1894.
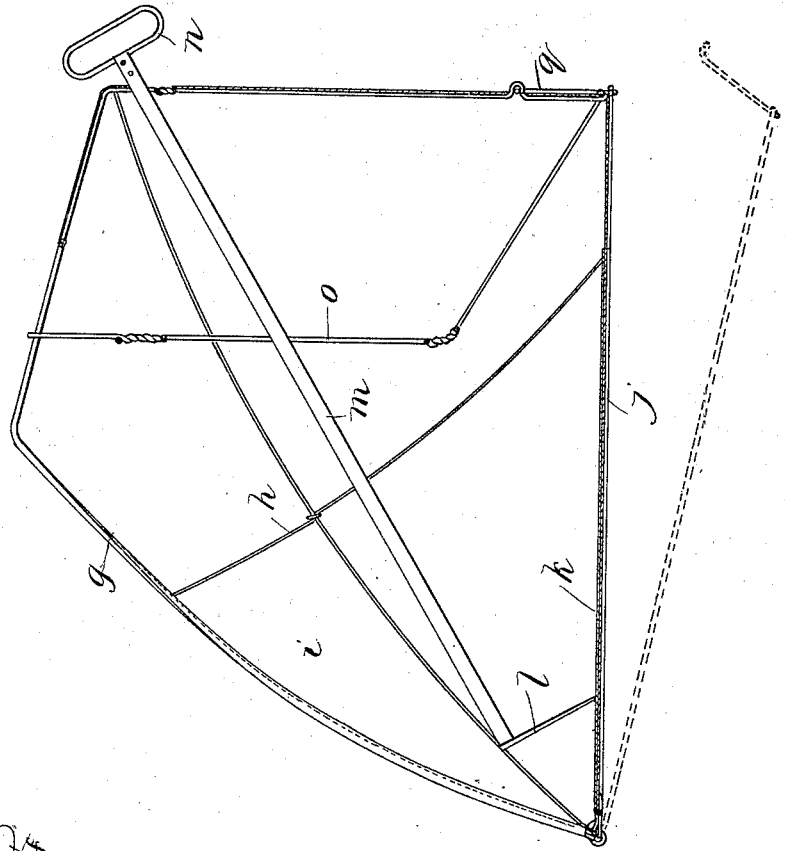
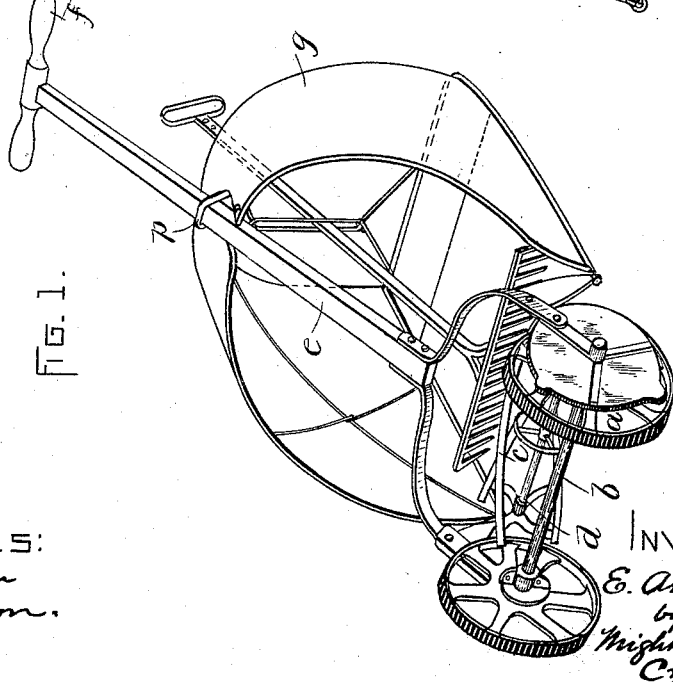
WITNESSES:
M. W. Jackson
H. D. Hanson
INVENTOR:
E. Anderson,
by
Wight, Brown & Crossley,
Attys.

UNITED STATES PATENT OFFICE.

EMIL ANDERSON, OF WOBURN, MASSACHUSETTS.

GRASS-COLLECTOR FOR LAWN-MOWERS.

SPECIFICATION forming part of Letters Patent No. 513,358, dated January 23, 1894.

Application filed April 24, 1893. Serial No. 471,622. (No model.)

*To all whom it may concern:*

Be it known that I, EMIL ANDERSON, of Woburn, in the county of Middlesex and State of Massachusetts, have invented certain new and useful Improvements in Grass-Collectors for Lawn-Mowers, of which the following is a specification.

My invention has relation to means for collecting the grass and other substance as it is cut by a lawn-mower in its use, so as to avoid raking the lawn and disturbing the turf.

It is the object of the invention to provide such improvements in the means mentioned as will render the collector light in weight, of requisite strength, of large capacity, and so equipped as to have the material "loaded" therein entirely out of the way of the operative means.

The invention consists of a grass-collector for lawn-mowers comprising a frame or casing supported by the handle and frame of the machine in such position as to have the grass cut by the knives delivered in the collector, and a reciprocatory rake arranged to be operated by hand to draw the cut grass from time to time back in the collector out of the way of the knives and other operative parts. The collector frame is by preference made of wire, covered with a fabric which may be treated so as to be rendered waterproof, though the said collector frame may be otherwise constructed, all as will be hereinafter more fully described and claimed.

Reference is to be had to the annexed drawings and the letters marked thereon forming a part of this specification, the same letters designating the same parts or features as the case may be, wherever they occur.

Of the drawings—Figure 1 is a perspective view of my improvement complete, showing the manner in which it may be supported from the handle and frame of a lawn-mower. Fig. 2 is a central sectional view of the invention.

In the drawings $a$ $a$ designate the traction wheels of a lawn-mower. $b$ is the axle. $c$ designates the cutters secured to the cutter-shaft $d$. $e$ is the pole connected with the axle $b$, and provided with the handles $f$. All these things are, or may be, of common construction, arrangement and function.

$g$ designates my improved grass-catcher which consists of a casing composed of a wire frame $h$ covered with cloth, or flexible material $i$. The flexible covering $i$ extends from the base or bottom $j$ of the grass-catcher up the sides and over the top as well as down the rear. The bottom $j$ may be composed of any suitable material, but it is desired that the upper forward portion thereof should be covered with sheet metal $k$, which sheet metal covering $k$ for the bottom should extend from the forward edge to, or nearly to the rear. The opening in front of the device slopes backward from the lower forward edge for a purpose to be presently explained.

$l$ designates a rake provided with a suitable handle $m$ which extends back through the rear of the grass-catcher $g$, and is provided with means as a loop $n$ or other suitable contrivance on the rearward end, so that it may from time to time be employed by the operator who may take hold of the handle, raise the rake, push it forward and depress it, and then rake back on the metallic covering to the bottom $k$ the grass cut off by the cutters and thrown into the receptacle at its forward end.

$o$ designates a guide arranged within the receptacle or casing so as to keep the rake in proper position in moving it forward and backward by the operator.

This improved contrivance may be supported upon the handle or pole $e$ as at $p$ from the top of the same, and also be suitably connected with the parts by which the pole or handle of the lawn-mower is attached to the traction wheels. The forward edge of the grass-catcher will be supported as near the point where the grass is cut as may be practicable, and the action of the rapidly revolving cutters will throw the grass well into the receptacle so that it need not be constantly drawn back therein. The opening in front sloping backward as it does, provides means whereby the grass may not be accidentally thrown over the top in front by the action of the cutters.

I prefer to hinge the bottom of the receptacle at its forward end to the frame so that the rearward end may be latched up in position by a latch or convenient device $q$ in order that when the receptacle becomes filled and it is desired to dump the load out therefrom, the catch or latch $u$ may be released, and the bottom allowed to drop down to the position shown in dotted lines in Fig. 2, and so discharge the load.

By my invention it will be seen that a light and convenient device is provided whereby the grass cut by a lawn-mower may be collected as it is cut, and so avoid raking the ground over which a lawn-mower has traveled.

Having thus explained the nature of the invention and described a way of constructing and using the same, though without attempting to set forth all of the forms in which it may be made or all of the modes of its use, it is declared that what is claimed is—

1. A grass-collector for lawn-mowers comprising in its construction a casing arranged to receive the grass from the cutters, and a reciprocatory rake provided with a handle for operating the same arranged to draw the cut grass back in the collector, said handle extending back and beyond the casing on a line coincident with the line of the pole by which the machine is moved, as set forth.

2. A grass-collector for lawn-mowers comprising in its construction a casing consisting of a cloth-covered wire frame arranged to receive the grass from the cutters, and a reciprocatory rake provided with a handle for operating the same, arranged to draw the cut grass back in the collector, said handle extending back and beyond the casing on a line coincident with the line of the pole by which the machine is moved, as set forth.

3. A grass-collector for lawn-mowers comprising in its construction a casing consisting of a cloth-covered wire frame provided with a sheet-metal covering in the forward part of its bottom, and a reciprocatory rake provided with a handle for operating the same, arranged to engage the cut grass on the sheet-metal covered part and draw it back in the collector, said handle extending back and beyond the casing on a line coincident with the line of the pole by which the machine is moved, as set forth.

In testimony whereof I have signed my name to this specification, in the presence of two subscribing witnesses, this 7th day of April, A. D. 1893.

EMIL ANDERSON.

Witnesses:
ARTHUR W. CROSSLEY,
A. D. HARRISON.